Sept. 9, 1958 R. C. DU BOIS 2,851,049
HIGH SPEED CONTROL APPARATUS
Filed Sept. 12, 1955
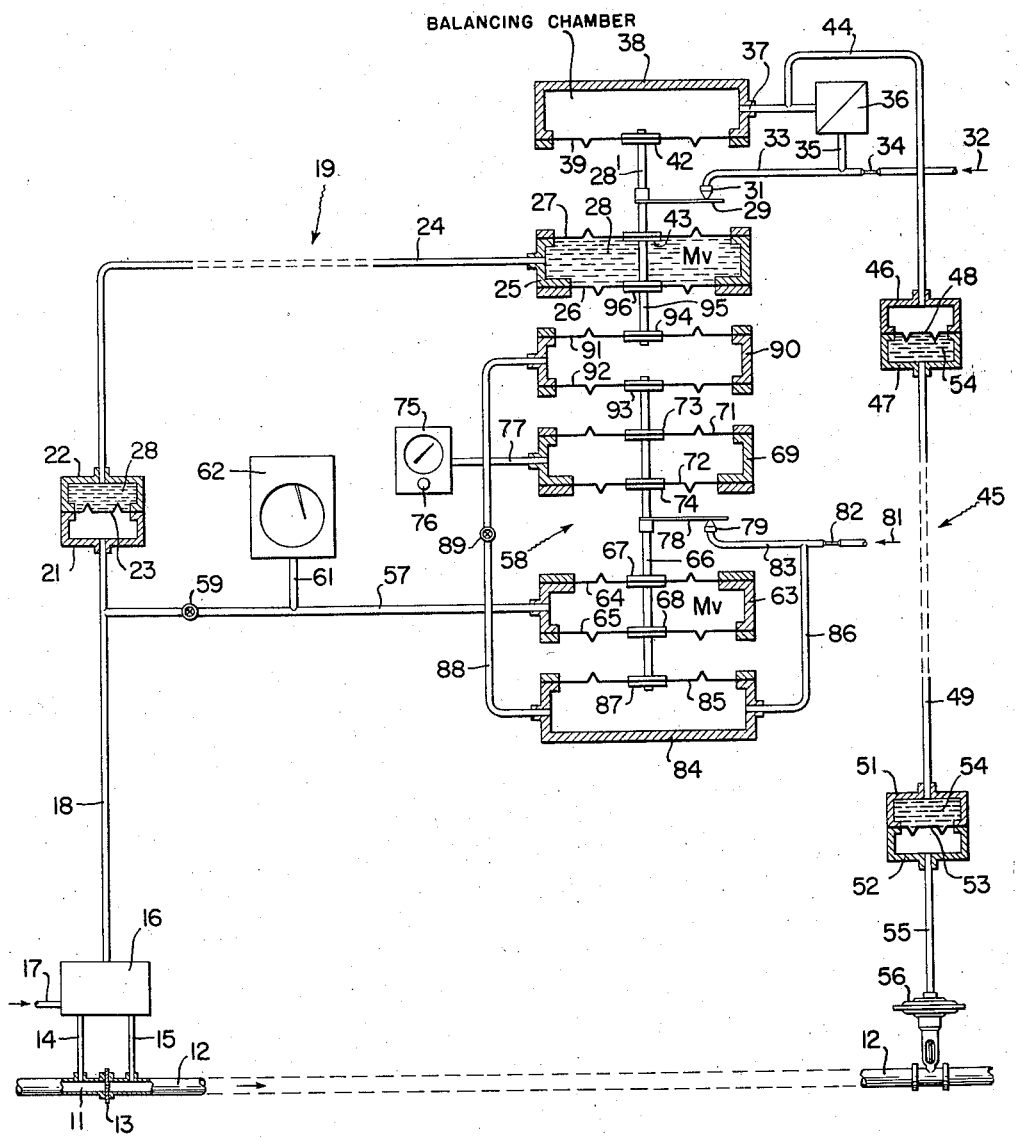
INVENTOR.
Robert Clark Du Bois
BY Arthur H. Swanson
ATTORNEY.

United States Patent Office 2,851,049
Patented Sept. 9, 1958

2,851,049
HIGH SPEED CONTROL APPARATUS
Robert Clark Du Bois, Fairfield, Conn., assignor to Minneapolis-Honeywell Regulator Company, Minneapolis, Minn., a corporation of Delaware
Application September 12, 1955, Serial No. 533,667
10 Claims. (Cl. 137—86)

A general object of the present invention is to improve the proportional speed of response of a control apparatus by the incorporation of novel liquid pressure signal transmitting means in a fixed band pneumatic type controller.

A conventional type of pneumatic controller of the prior art type may contain three sections such as a balancing section, a reset section, and a pilot section. The present invention is concerned with a controller of this type which provides a well known two mode control commonly referred to as proportional plus reset. A controller possessing this type of control receives two transmitted pneumatic air pressures, one from a variable measuring unit which is proportional to the magnitude of a variable that is to be controlled, and a second manually adjusted air pressure from a control point setting unit. Such a controller will respond to the differences between the two transmitted air pressures by moving a plurality of flexible members and a flapper attached thereto either toward or away from a fixed nozzle located in the balancing section of the controller. As this flapper is moved toward or away from the nozzle a pilot relay will be actuated so as to either increase or decrease its output pressure. As the flapper is moved, for example, towards the nozzle, the output pressure of the relay is increased and when it is moved away from the nozzle it is decreased. This pilot valve output pressure is transmitted to a final control element which in turn controls the magnitude of the variable.

In order to provide an improved speed of response for such a controller, the present invention is directed to the use of a liquid filled unit for rapidly transmitting an input variable signal into the controller.

More specifically, this liquid filled input signal transmitting unit connects the output pressure from a variable measuring unit to a chamber in the proportional band stage of the controller. With this arrangement a change in the variable being controlled will cause the walls of this flexible chamber to move very rapidly in one direction or the opposite, depending on whether the magnitude of the variable being measured is increasing or decreasing. This movement is transmitted to the flapper controlling the output pressure of the controller and the flapper will be rapidly moved toward or away from the fixed nozzle so as to effect a proportional change in the output pressure of the controller.

It is also another object of the invention to provide an additional liquid filled unit in the line transmitting this output pressure of the controller to a final control element so the time required to transmit this signal may be expedited. In view of the above it is thus evident that the addition of the two pressure actuated liquid filled units to a fixed band type of controller will enable such a controller to substantially immediately respond to a measured variable change sent to it by a variable measuring unit.

It is therefore still another more specific object of the present invention to provide the aforementioned controller with a liquid filled unit in its proportional stage section and a similar unit in its output transmitting line, which units will be particularly beneficial in processes in which immediate response to a measured variable change must be immediately corrected.

The controller in the present invention is provided with a novel pneumatic reset means in the form of a chamber having flexible walls. This chamber contains a pressure which is an integral function of the difference between the pressure representing the magnitude of the variable being transmitted to the controller and the control point pressure also being sent to the controller by the control transmitting index. The liquid filled chamber in the proportional band stage of the controller is connected to this reset chamber in the reset stage by means of a mechanical connection. With this arrangement, a resetting action may be superimposed on the proportional band stage of the controller so that the output pressure transmitted by the controller will be altered by the reset stage until the true measured variable is restored to some predetermined set point value.

It is therefore an additional object of the invention to provide a multiple stack arrangement for a fixed band controller which will provide not only an immediate response to a measured variable change so that such a change may be immediately corrected but also a resetting action which will continue until the true measured variable is restored to some predetermined set point value.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

The arrangement shown in the drawing illustrates how the fixed band pneumatic stack controller of the present invention may be used to control the flow of a variable which in this case is the flow of fluid passing through a flow line.

The control apparatus shown in the drawing is used to control a variable, such as the flow of a fluid 11 flowing in a conduit 12. The drawing also shows an orifice plate 13, two conduits 14, 15 connecting the pressures on either side of the orifice 13 to a variable measuring unit of the differential pressure measuring type 16. Connected to this measuring unit there is shown an air supply 17 and a transmitting conduit 18. Connected to the end of the conduit 18 is a liquid pressure signal transmitting unit 19. This unit 19 comprises two chambers 21, 22 separated by a flexible diaphragm 23, a transmission line 24, a chamber formed by wall 25 and diaphragm 26, 27 and a liquid 28 in the chamber 22, transmission line 24, and chamber 25, 26, and 27. Connected to the diaphragm 27 is a flapper actuating rod 28' having fixedly attached thereto a flapper 29 which cooperates with a fixed nozzle 31. A supply pressure 32 is shown flowing through conduit 33 past a restriction 34 through the nozzle 31. Connected to this air supply line 33, there is a conduit 35. This conduit 35 connects the conduit 33 to a pilot valve 36. The pilot valve 36 in turn is connected by means of the conduit 37 to a balancing chamber formed by a fixed wall member 38 and a flexible diaphragm member 39. The flexible diaphragm member 39 in turn is fixedly attached by means of a suitable clamping disc 42 to the flapper actuating rod 28'. The other end of the flapper actuating rod 28' is also fixedly connected by means of a suitable clamping disc to the diaphragm 27.

Connected to the conduit 37 is a conduit 44 for connecting the pressure from the pilot valve 36 to a second liquid pressure signal transmitting unit 45. This second liquid pressure signal transmitting unit 45 comprises a chamber 46, 47 separated by a flexible diaphragm 48, a transmission line 49, a receiving chamber comprising the chamber 51 and 52 separated by a flexible diaphragm 53, and a liquid 54 in the chamber 47, transmission line 49, and chamber 51. A conduit 55 is shown connecting the chamber 52 to a conventional pneumatically operated control valve 56. The control valve 56 is connected to the conduit 12 at a point remote from the location at which the flow through this conduit is being measured by the variable measuring unit 16.

Also shown in the drawing is a conduit 57 connected to the transmission line 18 at one of its ends and to the automatic reset section 58 through an adjustable restriction 59 at its other end. A conduit 61 is also shown for connecting the pressure in a conduit 57 to a suitable recording means 62. The conduit 57 is also connected to the automatic reset section 58 by means of the fixed and flexible members 63, 64, 65 forming a measured variable chamber Mv. A connecting rod 66 is connected to the flexible diaphragm members 64 and 65 through suitable connecting discs 67, 68.

Within the automatic reset stage of the controller there is shown a set point chamber formed by the fixed wall 69 and flexible diaphragm walls 71 and 72. The flexible walls 71 and 72 of this chamber are connected to the upper portion of the connecting rod 66 by suitable clamping discs 73, 74. A control point setting unit 75 having a manually adjusted air pressure setting knob 76 is shown connected to the set point pressure chamber by means of the conduit 77.

Midway between the flexible diaphragm member 72 of the set point chamber and the diaphragm 64 of the measured variable chamber is a flapper 78 cooperating with a fixed nozzle 79. This flapper 78 is shown fixedly connected to the rod 66. A supply pressure is shown flowing in the direction of the arrow 81 through a restriction 82 in the conduit 83 through the nozzle 79. This arrangement also shows a chamber having a fixed wall portion 84 and a flexible diaphragm 85. This pressure chamber is shown connected to the conduit 83 by way of the conduit 86. The flexible diaphragm 85 of this chamber is connected to the connecting rod 66 by means of suitable clamping disc 87. This pressure chamber 84, 85 is connected through means of the conduit 88 having a restriction 89 therein to a reset chamber 90—92. The part 90 of this chamber is of a fixed wall configuration whereas the remaining walls of this chamber 91 and 92 are of a flexible diaphragm type. The flexible diaphragm 92 is connected by a suitable disc clamping means to the connecting rod 66. The other diaphragm 91 is connected by means of a suitable disc 94 to the connecting rod 95. The upper portion of this connecting rod 95 is fixedly connected by means of a suitable clamping disc 96 to the diaphragm 26 and by means of a disc 43 to the diaphragm 27 of the pressure filled chamber 25—27.

To illustrate the operation of the aforementioned type of proportional control it will be assumed that a load upset condition or a condition in which a sudden surge in the fluid pressure 11 flowing through conduit 12 has occurred. This surge of pressure will cause the difference in pressures in the fluid existing on either side of the orifice plate 13 to increase. This difference in pressure is transmitted by the conduits 14 and 15 to the conventional type of differential pressure measuring and transmitting means 16. This means 16 regulates the amount of pressure flowing from the air supply 17 to the transmission line 18 in accordance with the magnitude of the aforementioned flow through conduits 14 and 15. The pressure flowing through this conduit 18 is commonly known as a measured variable pressure (M. V.). This M. V. pressure is transmitted through conduit 18 to one of the previously mentioned liquid pressure signal transmitting units 19. As the flow 11 through the conduit 12 thus increases the differential pressure transmitter 16 will transmit a proportionally increased pressure (M. V.) through transmission line 18 to chamber 21 of the liquid pressure signal transmitting unit 19. When this occurs the diaphragm 23 will be forced in an upward direction and the liquid 28 will flow out of chamber 22 through transmission line 24 into chamber 25—27.

When the volume of liquid in this chamber 25—27 is increased in the aforementioned manner the diaphragm 27 along with the flapper actuating rod 28 will be moved immediately in an upward direction. As this upward movement takes place the flapper 29 will be moved closer to the nozzle 31. This latter action will cause the supply pressure 32 flowing through the conduit 33 and out of the nozzle 31 to be reduced. This in turn will increase the pressure in the conduit 33 between the nozzle and the restriction 34. A second conduit 35, connected to the conduit 33, transmits this proportionately greater pressure to a pilot valve 36. As this pilot valve 36 receives this increased pressure from the conduit 35 it delivers a proportionately greater pressure through the conduit 37 to the balancing chamber formed by the wall 38 and diaphragm 39. Since the diaphragm 39 is connected to the rod 28' by means of a suitable disc 42, and diaphragm 27 is connected to this same rod by means of discs 43 the pressure in the balancing chamber 38, 39 will act as a force balancing means since it will act in a downward direction on the rod 28'.

The proportionately greater pressure output of valve 36 is transmitted to the second liquid pressure signal transmitting unit 45 by way of conduit 44.

When the flow of fluid 11 passing through the conduit 12 causes the pilot valve to deliver the aforementioned proportionately greater pressure through transmission line 44, the diaphragm 48 will be forced in a downward direction from the position shown in the drawing. This latter action will cause the fluid 54 to be forced to flow through the transmission line 49 to the remotely located chamber 51. The diaphragm 53 will then be compressed in a downward direction. This action permits a greater amount of force to be applied through conduit 55 to the head of a conventional pneumatically operated control valve 56. The increased pressure applied to the valve in this manner will rapidly move the valve to a partially closed position and the surge and flow of fluid 11 passing through the conduit 12 as was sensed by the transmitting unit 16 will be corrected.

From the above description it can be readily seen that the addition of the two novel liquid signal transmitting units 19 and 45 have provided a conventional fixed span pneumatic stack type controller with a control action which will immediately correct a sudden surge in flow of a fluid passing through a line.

As the transmitter 16 transmits a pressure, which is proportional to the increase in the flow of fluid 11 passing through the conduit 12, to the aforementioned proportional band stage of the controller this transmitter 16 also transmits this same pressure, by way of transmitting lines 17 and 57 to a section of the controller known as the automatic reset stage 58 and a recording means 62. Located in transmission line 57 there is shown a variable restricting means 59 which may be adjusted to dampen out any unwanted frequency ripples or oscillations that may be present in the fluid that is passing through the transmission line 57. The provision of such an adjustable restricting means 59 will thus prevent these undesirable ripples or oscillations from being transmitted to the pen of the recorder 62 where they would cause a wiggling pen recording to occur. When the surge in the flow of fluid 11 passing through the conduit 12 occurs the air pressure being transmitted by the conduits 18, 57 to the chamber 63—65 will be increased. When the increase in this chamber pressure occurs the upper diaphragm 64 and rod 66 attached thereto will be moved in an upward direction. The set point pressure chamber 69, 71, 72 and the measured variable chamber 63—65 of this controller are so arranged that their respective pressure difference will be transmitted in the form of a mechanical motion to the rod 66 and flapper 78 connected thereto. When the sudden surge in fluid 11 passing through the conduit 12 occurs the diaphragm 64 will in an instant of time be moved in an upward direction against the force of the pressure in the set point chamber which is acting on the diaphragm 72. Should the magnitude of the measured variable pressure be greater than the predetermined set point pressure the flapper 78 will be moved in an upward direction away from the nozzle 79. When this occurs the amount of the supply air pressure 81 on the left side of the restriction 82 of the conduit 83 that is bled to atmospheric pressure will be immediately increased so that the nozzle back pressure will decrease. Since the chamber known as a negative feedback chamber comprising the wall 84 and diaphragm 85 is connected by means of a conduit 86 to the conduit 83, this chamber 84, 85 will respond to this back pressure change. As the diaphragm 85 is connected by a suitable connection 87 to the rod 66 the upward force of the pressure in this chamber acting on the rod opposes the downward force due to the pressure in chamber 63—65. If the surge in the conduit 12 is momentary, the reset controller section 58 will produce no measurable change in the controlling action on the valve 56. However, if the measured variable pressure in chamber 63—65 deviates from the set point pressure in chamber 69—72 for a period of time, the resetting action of the apparatus will become effective. When there is an unbalance between set point pressure and M. V. pressure of sustained deviation the automatic reset stage will operate in the following manner. The pressure in chamber 84—85 will be slowly fed through the adjustable reset restricted line 88, restriction 89 to the reset chamber formed by the wall 90 and the diaphragms 91, 92. The pressure acting on the diaphragm 92 serves to slowly wipe out the rebalancing force on rod 66 due to the pressure acting on diaphragm 85. Once this balance between these two pressures, measured variable and set point, has been achieved no reset action or flow through the conduit 88 will take place. The arrangement of the automatic reset stage in this manner will thus provide a pressure in the reset chamber 90—92 which is an integral function of the difference between the pressure in the measured variable chamber 63, 64, 65 and the pressure in the set point chamber 69, 71, 72 as sensed by the lower stack of this controller.

While the pressure in this reset chamber 90—92 is being applied in the aforementioned manner to the reset stage it is also used to modify the initial position to which the flapper 29 has been moved by the proportional band stage of the controller.

When, for example, a sustained surge in the pressure of the M. V. occurs the pressure in the reset chamber 90—92 is initially increased due to the M. V. pressure being greater than the predetermined set point pressure. When this occurs the diaphragm 91, clamping disc 94, rod 95, clamping disc 96 and diaphragm 26 will be forced to move in an upward direction. This upward force acting on the diaphragm 26 in this manner will apply a force through the liquid 28 in an upward direction against the diaphragm 27 so as to force the clamping disc 43, rod 28' and the flapper 29 also in this upward direction. This upward force will be opposed by a downward force due to the output pressure of the pilot valve 36 acting on the diaphragm 39, clamping disc 42 and the flapper actuating rod 28'. Furthermore, this reset stage of the controller will cause the pressure acting in the diaphragm 91 to be continuously changed until the difference in set point pressure and M. V. pressure is wiped out. When a difference ceases to exist between these two pressures the upward force acting on the flapper, which was created by the reset stage, will be maintained at a predetermined force level. As long as there is no difference between these two pressures the reset stage will cease to have any further influence on the movement of the flapper 29. The modifying flapper movement caused by the reset stage of this controller will thus have a modifying flapper action which will be activated at an instant of time after the aforementioned deviation of the M. V. from the set point has taken place. Furthermore, as this modifying flapper action is taking place the output pressure of the controller will be continuously modified so as to more accurately position the control valve 56. This greater accuracy is brought about because the initial position to which the control valve is moved by the proportional band stage of the controller is only determined by the magnitude of the M. V. signal whereas the modified or reset stage position to which this valve is positioned is dependent on the difference in the magnitude of the M. V. signal and a predetermined set point value.

By placing the aforementioned two liquid filled units 19 and 45 in a conventional fixed band pneumatic controller it has enabled a proportional control action of such a controller to take place in a much more rapid manner than has heretofore been possible. As previously noted this type of control action is particularly desirable where a sudden surge in the variable to be controlled cannot be tolerated and therefore must be immediately corrected. The present controller accomplishes this by providing a means which will immediately modify the regulating action of a final control element and thus cause a corrective action in the variable to immediately take place.

The controller in this present invention has the further advantage in that at an instant of time after this first initial proportional corrective action has taken place under conditions of a sustained measured variable deviation the pressure in the reset chamber of the automatic reset stage of such a controller will continue to modify the initial corrective action until the true measured variable pressure is restored to the set point. Thus, fast proportional response is combined with the accuracy to be obtained in a pneumatic reset unit.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. A hydro-pneumatic system comprising, a pneumatic pressure transmitter arranged to transmit a pressure which varies in accordance with the magnitude of a variable, a chamber having one portion partially filled with an incompressible liquid, a first connection between said transmitter and the remaining portion of said chamber, a proportional controller having a section for regulating the proportional output pressure of said controller and a section for providing automatic reset, a connection between said first connection and said automatic reset section, said regulating section having a flexible chamber, a liquid filled connection between said flexible chamber and said partially filled chamber portion, a pressure amplifying means, a vehicle operably connecting said flexible chamber with said amplifying means and a second vehicle partially filled with liquid for operably connecting the pneumatic output pressure of said amplifier to the head of a fluid pressure regulated control valve.

2. A hydro-pneumatic transmitting system for maintaining a variable condition at a predetermined value comprising, a pneumatic pressure transmitting means arranged to transmit a pressure which varies in accordance with the magnitude of a variable, a first liquid pressure signal transmitting unit connected between said signal transmitting means and a chamber in the proportioning band portion of a controller, a second liquid pressure signal transmitting unit operably connecting the output pressure of said proportioning band portion to a control valve means, a pneumatic reset portion in said controller, a pneumatic pressure connection for transmitting the magnitude of said variable between said transmitting means and a chamber in said reset portion, said incompressible fluid in each of said hydro-pneumatic liquid pressure connections acting as a pressure transmitting medium through which pressure changes being transmitted by said transmitting means may be instantaneously transmitted to said control valve means, an operable connection between said pneumatic reset portion and said proportional band portion for effecting a reset control action on said pressure changes.

3. A hydro-pneumatic system comprising, a pneumatic pressure transmitter arranged to transmit a pressure which varies in accordance with the magnitude of a variable, a first connection between said transmitter and a stage of a proportional controller regulating the magnitude of the output pressure, an automatic reset stage in said controller, a second connection between said first connection and said automatic reset stage, a chamber having one portion partially filled with a liquid, an amplifying means for amplifying said output pressure, a third connection between said amplifying means and the remaining portion of said liquid filled chamber, and a liquid pressure transmitting vehicle for operably transmitting said output pressure of said amplifier acting on said liquid to the head of a fluid pressure variable regulating means.

4. A hydro-pneumatic system comprising, a pneumatic pressure transmitter arranged to transmit a pressure which varies in accordance with the magnitude of a variable, a chamber having one portion partially filled with an incompressible liquid, a first connection between said transmitter and said remaining portion of said chamber, a proportional controller having a section for regulating the proportional output pressure of said controller and a section for providing automatic reset, a second liquid filled connection between said liquid filled portion of said chamber and said proportional section, a conduit connecting said first connection and said automatic reset section, a pressure amplifier, a means for operably connecting said proportional section to said amplifier, and another means for operably connecting said amplifying means to the head of a fluid pressure regulated control valve.

5. A hydro-pneumatic system comprising, a means for transmitting an elastic fluid pressure proportional to the magnitude of a variable through a first conduit, a means for supplying a regulable elastic fluid pressure, a pressure actuated controller having a first flexible chamber, a second conduit connecting said regulable fluid pressure to said first chamber, said controller having a second flexible chamber in a proportional band section thereof, a third flexible chamber in an automatic reset section thereof, a third conduit filled with a non-compressible liquid for connecting the said elastic fluid pressure in said first conduit to said second chamber, a fourth conduit connecting said elastic fluid pressure in said first conduit to said third chamber, a vehicle for transmitting the pressure in the said second chamber in the form of a pressure signal to a means for regulating said variable, said reset stage comprising a reset chamber, a connection between said second chamber and said reset chamber, said connection acting to introduce the true difference between said pressures in said first and third chambers to said second chamber as said proportional band stage transmits said signal to said variable regulating means.

6. An improved means of controlling the transmission of the pressure of an elastic fluid that is proportional to the magnitude of a variable from a transmitting means to a fluid pressure actuated control valve comprising, a first vehicle having a restriction therein for transmitting said elastic fluid to a first flexible chamber of a receiving means, a second vehicle partially filled with a liquid operably connected to said first vehicle at one end and to a second flexible chamber in said receiving means at its other end, a booster actuated control valve, a pilot valve operably connected to said second chamber, a set point chamber containing a regulatable fluid pressure therein, a reset chamber operably connected to said first and set point chambers so as to produce a pressure therein equal to the difference between said first and set point chambers, and a connection between said reset chamber and said second chamber for modifying the pressure in said second chamber until the said difference in pressure between said set point chamber and said first chambers are equal.

7. A control apparatus comprising, a stack type controller having an automatic reset stage portion, a force balanced pressure chamber acting as a portion of a proportional band stage, an operable connection between the said stages, a vehicle for transmitting a pressure signal to a chamber in each of said stages, and a hydro-pneumatic liquid pressure unit operable to transmit a liquid pressure signal proportional to said signal in said force balance pressure chamber to a control element wherein the said reset stage acts through said operable connection located between said reset stage portion and said first mentioned chamber in said proportional band stage to modify said transmitted liquid pressure signal.

8. The combination in a force balanced controller of a proportional band stage having a first chamber for receiving a signal of varying magnitude in the form of a liquid pressure, a vehicle connected at one end to a control member and at its other end to one end of a liquid pressure signal transmitting vehicle, a force balancing pressure chamber having one portion operably connected to said first chamber and another part to the said vehicle acting as a means of transmitting a liquid pressure signal between said force balancing pressure chamber and said control member in accordance with changes in the magnitude of said pressure signal received by said first chamber, and an automatic reset stage operably connected to said first chamber to restore the level of the signal received by said first chamber of said proportional band stage to a predetermined level.

9. A force balanced stack controller, said controller comprising, a pneumatic fluid pressure actuated automatic reset stage portion, a proportional band stage portion, a first means comprising a liquid signal transmitting means for transmitting a fluid pressure signal to and from a first chamber in said proportional band stage portion which is proportional to the magnitude of a variable, a vehicle connected to said first means for also transmitting said signal to a second chamber in said reset stage portion, a set point chamber operably connected to a flexible portion forming one wall of said second chamber, an operable connection between said first chamber and a second flexible wall of said second chamber, means to transmit pressure signal differences between said transmitted fluid pressure signal and a predetermined set point pressure that is retained within said set point chamber to said means transmitting a fluid pressure signal from said first chamber so as to effect a reset control action.

10. Apparatus as defined in claim 9 wherein said automatic reset stage portion is effective to vary the signal being transmitted from said proportional band stage under conditions of sustained deviations between a predetermined set point pressure signal in said set point chamber and the measured variable signal pressure in said second chamber by means of a liquid pressure coupling to said proportional band stage until said deviation has been eliminated.

References Cited in the file of this patent

UNITED STATES PATENTS

| | | |
|---|---|---|
| 2,692,581 | Ziebolz | Oct. 26, 1954 |
| 2,737,962 | Almeras | Mar. 13, 1956 |
| 2,737,964 | Olah | Mar. 13, 1956 |
| 2,745,423 | Grogan | May 15, 1956 |